US012742563B2

(12) United States Patent
Mohd Zulkefli et al.

(10) Patent No.: US 12,742,563 B2
(45) Date of Patent: Sep. 22, 2026

(54) AIR CONDITIONING PREDICTIVE POWER MANAGEMENT SYSTEM AND METHOD

(71) Applicant: Eaton Intelligent Power Limited, Dublin (IE)

(72) Inventors: Mohd Azrin Mohd Zulkefli, Eden Prairie, MN (US); Souvik Chandra, Lakewood, CO (US); Chaitanya Ashok Baone, Fremont, CA (US)

(73) Assignee: Eaton Intelligent Power Limited (IE)

(*) Notice: Subject to any disclaimer, the term of this patent is extended or adjusted under 35 U.S.C. 154(b) by 511 days.

(21) Appl. No.: 18/192,259

(22) Filed: Mar. 29, 2023

(65) Prior Publication Data

US 2023/0314024 A1 Oct. 5, 2023

Related U.S. Application Data

(60) Provisional application No. 63/325,946, filed on Mar. 31, 2022.

(51) Int. Cl.

*F24F 11/46* (2018.01)
*F24F 11/58* (2018.01)
(Continued)

(52) U.S. Cl.

CPC .............. *F24F 11/46* (2018.01); *F24F 11/58* (2018.01); *F24F 11/64* (2018.01); *H02J 3/14* (2013.01);

(Continued)

(58) Field of Classification Search

CPC .. F24F 11/46; F24F 11/58; F24F 11/64; H02J 3/14

(Continued)

(56) References Cited

U.S. PATENT DOCUMENTS 8,924,034 B2 * 12/2014 Deshpande ........ G05D 23/1924 703/2
9,600,016 B2 3/2017 Waki
(Continued)

FOREIGN PATENT DOCUMENTS

CN 110243059 B * 3/2021 .............. F24F 11/64
CN 112460761 A * 3/2021 .............. F24F 11/77
(Continued)

OTHER PUBLICATIONS

CN-112460761-A English Translation (Year: 2021).*
(Continued)

*Primary Examiner* — Crystal J Barnes-Bullock
(74) *Attorney, Agent, or Firm* — Merchant & Gould P.C.

(57) ABSTRACT

A system and method for managing a distributed energy resource (DER) within an indoor structure, the method including receiving a time window, receiving a power consumption limit, measuring an outdoor temperature, determining an indoor temperature of the indoor structure based at least on the measured outdoor temperature, the received power consumption limit, and the received time window, determining a minimum time of operation of the DER so that a power consumption of the DER is equal to or below the received power consumption limit during the received time window without compromising the quality of service controlled by the DER.

7 Claims, 8 Drawing Sheets

(51) Int. Cl.
*F24F 11/64* (2018.01)
*H02J 3/14* (2006.01)
*F24F 110/10* (2018.01)
*F24F 110/12* (2018.01)

(52) U.S. Cl.
CPC ....... *F24F 2110/10* (2018.01); *F24F 2110/12* (2018.01)

(58) Field of Classification Search
USPC .......................................................... 700/278
See application file for complete search history.

(56) References Cited

U.S. PATENT DOCUMENTS 9,810,442 B2 11/2017 Matsuoka et al.
9,817,409 B2 11/2017 Murthy
10,180,672 B2 * 1/2019 Miura ..................... H02J 3/003
11,579,676 B2 * 2/2023 Nakamura ......... H05K 7/20209

FOREIGN PATENT DOCUMENTS

CN 113988560 A 1/2022
EP 4 254 707 A1 10/2023
EP 2889545 B1 * 6/2025 .............. F24F 11/65
JP 2019196898 A * 11/2019 .............. F24F 11/47
JP 2023122801 A * 9/2023 ........... G06F 1/3296

OTHER PUBLICATIONS

ESR for European Patent Application 23165325.4-1202, dated Aug. 25, 2023, 9 pages.
Office Action issued Oct. 27, 2025, in corresponding Canadian Patent Application No. 3,194,540.
Office Action issued Apr. 22, 2025, in corresponding Canadian Patent Application No. 3,194,540.

* cited by examiner

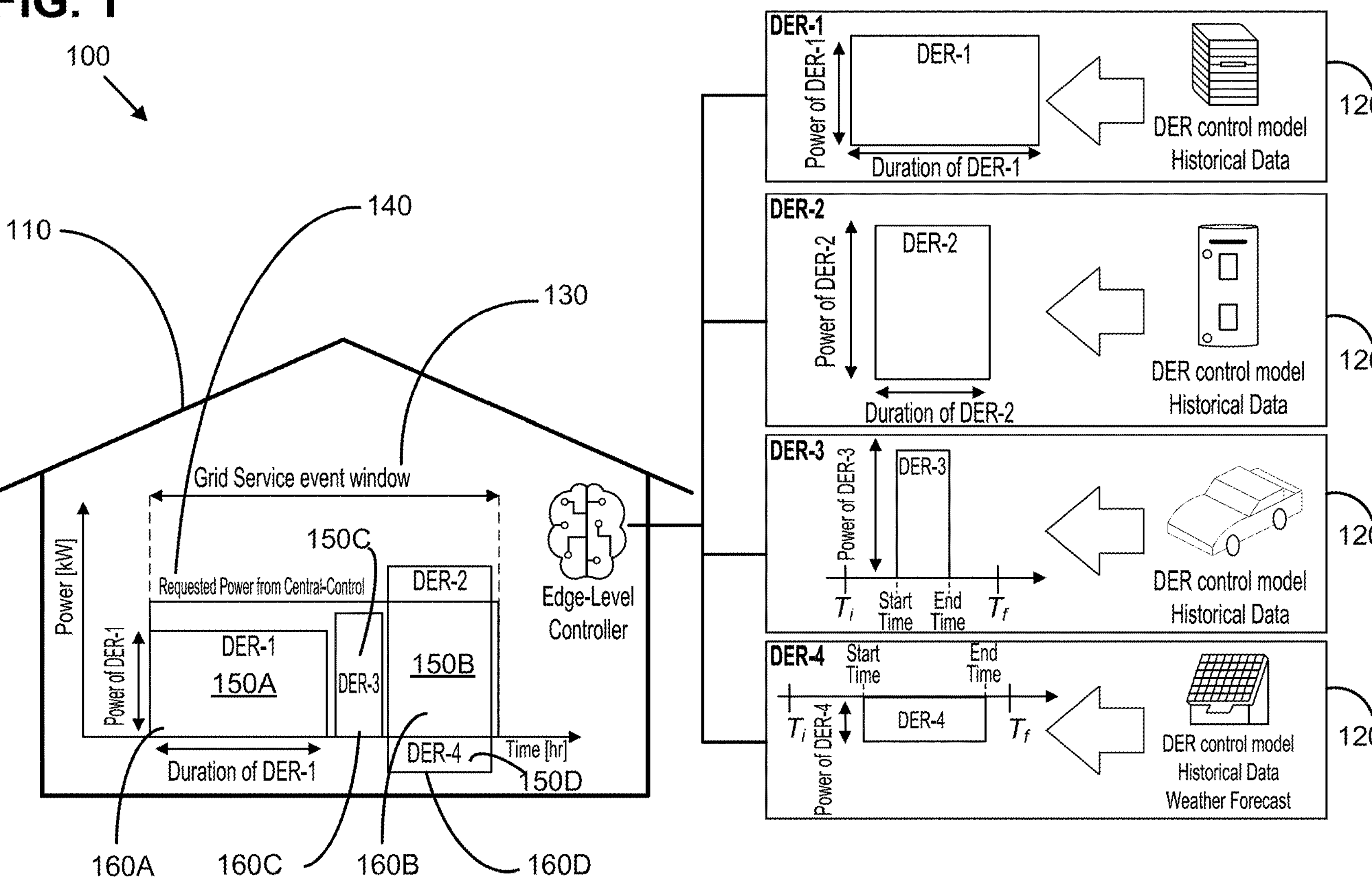
FIG. 1
100
110
140
130
Grid Service event window
150C
Requested Power from Central-Control
Power [kW]
Power of DER-1
DER-1
150A
DER-3
DER-2
150B
DER-4
Time [hr]
150D
Duration of DER-1
160A
160C
160B
160D
Edge-Level Controller
DER-1
Power of DER-1
Duration of DER-1
DER control model
Historical Data
120A
DER-2
Power of DER-2
Duration of DER-2
DER control model
Historical Data
120B
DER-3
Power of DER-3
$T_i$
Start Time
End Time
$T_f$
DER control model
Historical Data
120C
DER-4
Start Time
End Time
$T_i$
Power of DER-4
$T_f$
DER control model
Historical Data
Weather Forecast
120D AC Power (kW)
$P_{AC\_rated}$
Time (s)
$t_{min}$ Indoor Temp
(°C)
$T_{max}$
$T_1$
$T_2$
Time (s)
$t_{ON}$
$(t_{ON} + t_{min})$
$t_{DR}$ Outdoor Temp
(°C)
$T_{out1}$
$T_{out2}$
k
Time (s)

AIR CONDITIONING PREDICTIVE POWER MANAGEMENT SYSTEM AND METHOD

CROSS-REFERENCE TO RELATED APPLICATION

This application claims the benefit of U.S. Provisional Application No. 63/325,946, filed Mar. 31, 2022, the disclosure of which is hereby incorporated herein by reference in its entirety.

GOVERNMENT FUNDING

This invention was made with government support under Contract No. DE-EE0009023 awarded by the National Energy Technology Laboratory funded by the Office of Energy Efficiency & Renewable Energy of the United States Department of Energy. The government has certain rights in the invention.

TECHNICAL FIELD

Managing energy consuming appliances, also referred to as distributed energy resources (DERs), typically necessitates a local behind-the-meter controller to manage local DERs in a residential household. Air conditioning is a member of a family of systems and techniques that provide heating, ventilation, and air conditioning (HVAC) that are typically present in a home and that consume energy, particularly during peak usage times, especially when household members are at home.

BACKGROUND

In managing DERs, a controller typically allocates turning on and off schedules for local DERs to avoid exceeding a maximum power threshold during grid events such as, e.g., frequency regulation, voltage regulation, a Demand-Response (DR) event, while maintaining DERs Quality-of-Services and minimizing energy cost. Flexible load solutions for various grid services including frequency regulation and peak shaving are advantageous for power or electric utilities. To achieve this flexibility, utilities typically utilize a physical controller at home level to manage the operations of the distributed-energy-resources (DERs) such as the air-conditioner, electric water heater, electric vehicles, solar plus battery storage, and the like.

SUMMARY

In one aspect, the technology relates to a method of managing a distributed energy resource (DER) within an indoor structure, the method including receiving a time window, receiving a power consumption limit, measuring an outdoor temperature, determining an indoor temperature of the indoor structure based at least on the measured outdoor temperature, the received power consumption limit, and the received time window, determining a minimum time of operation of the DER so that a power consumption of the DER is equal to or below the received power consumption limit during the received time window without compromising the quality of service controlled by the DER.

In an example of the above aspect, the power consumption limit is applicable during the received time window. In another example, determining the indoor temperature as a function of time is described by Equation (4) below, wherein $T_{out}$ is the measured outdoor temperature, $R_{th}$ is an estimated thermal-resistance of the indoor structure, $C_{th}$ is an estimated thermal-capacitance of the indoor structure, $t_0$ is a start time of operation of the DER, $P_{AC}$ is the received power consumption limit, and k is a slope of variation of the outdoor temperature over time. In another example, determining the minimum time of operation of the DER with the assumption of linear outdoor temperature variation includes determining the minimum of time $t_{min}$ based on Equation (5), wherein $T_{max}$ is the maximum indoor temperature, $T_{out2}$ is the outdoor temperature at an end of operation of the DER, $t_{DR}$ is an end time of the received time window, $t_{ON}$ is an arbitrary start-time of operation of the DER, $T_1$ is an indoor temperature at time $t_{ON}$ and $T_{out1}$ is the outdoor temperature at a beginning of operation of the DER. In yet another example, determining the minimum time of operation of the DER with the assumption of constant outdoor temperature includes determining the minimum of time $t_{min}$ based on Equation (6).

In another aspect, the technology relates to a method of managing a plurality of distributed energy resources (DERs) within an indoor structure, the method including receiving a time window, receiving a power consumption limit, measuring a combined power consumption of DERs in operation during the received time window, and for each DER and during the received time window, determining a start time of operation and an end time of operation thereof so that the determined combined power consumption is equal to or lower than the received power consumption limit without compromising the quality of service controlled by individual DER.

In an example of the above aspect, measuring a combined power consumption of DERs in operation during the received time window includes calculating a sum of the power consumptions of each DER that is in operation during the received time window. In another example, when the measured combined power consumption of the DERs in operation during the received time window is greater than the received power consumption limit, the method further includes changing one of the start time and the end time of at least one of the DERs so that the measured combined power consumption of the DERs in operation during the received time window is equal to or less than the received power consumption limit without compromising the quality of service controlled by individual DER.

In another example of the above aspect, changing one of the start time and the end time of a DER includes changing one of the start time and the end time of the DER so as to reduce an overlap of the power consumption thereof with a power consumption of another DER during the time window. In yet another example, changing one of the start time and the end time of the DER so as to reduce the overlap of the power consumption thereof with a power consumption of another DER during the time window results in a lower combined power consumption without compromising the quality of service controlled by individual DER.

In yet another aspect, the technology relates to a system for managing a distributed energy resource (DER) within an indoor structure, the system including a data receiver, an updatable data repository functionally coupled to the data receiver, a display device functionally coupled to the data receiver, a processor operatively coupled to the data receiver, to the updatable data repository and to the display device, and a memory coupled to the processor. In an example of the above aspect, the memory stores instructions that, when executed by the processor, perform a set of operations including receiving, at the data receiver, a time window, receiving, at the data receiver, a power consumption limit, measuring, via the processor, an outdoor temperature, determining, via the processor, an indoor temperature of the indoor structure based at least on the measured outdoor temperature, the received power consumption limit, and the received time window, determining, via the processor, a minimum time of operation of the DER so that a power consumption of the DER is equal to or below the received power consumption limit during the received time window without compromising the quality of service controlled by individual DER. In an example of the above aspect, the DER includes one of an AC unit, a water heater, an electric vehicle charger, and a solar panel.

In a further aspect, the technology relates to a system for managing a plurality of distributed energy resources (DERs) within an indoor structure, the system including a data receiver, an updatable data repository functionally coupled to the data receiver, a display device functionally coupled to the data receiver, a processor operatively coupled to the data receiver, to the updatable data repository and to the display device, and a memory coupled to the processor. In an example of the above aspect, the memory stores instructions that, when executed by the processor, perform a set of operations including receiving, at the data receiver, a time window, receiving, at the data receiver, a power consumption limit, measuring, via the processor, a combined power consumption of DERs in operation during the received time window, and for each DER and during the received time window, determining, via the processor, a start time of operation and an end time of operation thereof so that the determined combined power consumption is equal to or lower than the received power consumption limit without compromising the quality of service controlled by individual DER.

In another example of the above aspect, the DERs include at least one of an AC unit, a water heater, an electric vehicle charger, and a solar panel. In yet another example, the system measures the combined power consumption of DERs in operation during the received time window by calculating a sum of the power consumptions of each DER that is in operation during the received time window. In a further example, when the measured combined power consumption of the DERs in operation during the received time window is greater than the received power consumption limit, the system changes one of the start time and the end time of at least one of the DERs so that the measured combined power consumption of the DERs in operation during the received time window is equal to or less than the received power consumption limit without compromising the quality of service controlled by individual DER.

BRIEF DESCRIPTION OF THE DRAWINGS

The accompanying drawings, which are incorporated in and constitute a part of the description, illustrate several principles of the present disclosure. A brief description of the drawings is as follows:

FIG. 1 is an overview of a control system for controlling a plurality of DERs in an indoor structure, in accordance with various principles of the present disclosure.

DETAILED DESCRIPTION

Figure 2:
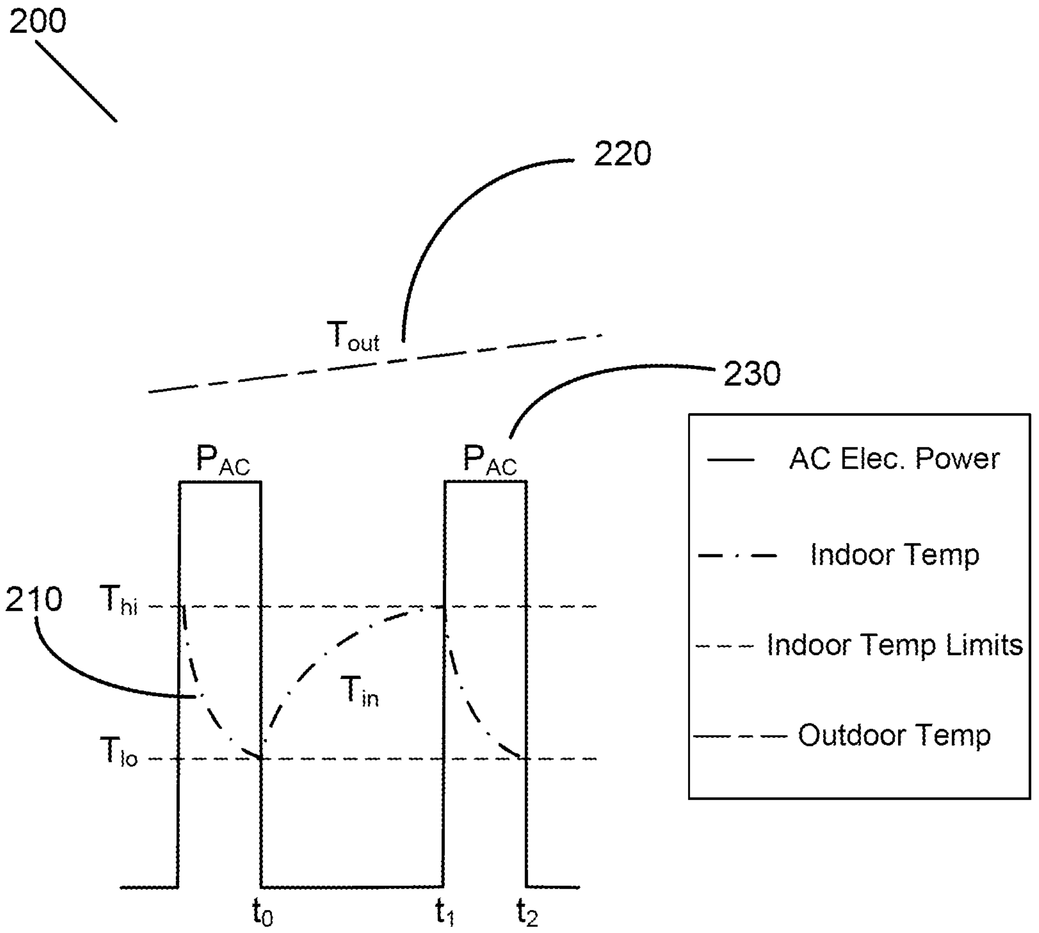
FIG. 2 is a diagram illustrating an air conditioning (AC) operation.

Decentralized distributed energy resources (DERs) management typically necessitates a local behind-the-meter controller to manage local DERs. The controller allocates turning on and off schedules for local DERs to avoid exceeding a maximum power threshold during a Demand-Response (DR) event, while maintaining DERs Quality-of-Services and minimizing energy cost. Examples of the present disclosure allow to determine a minimum on-duration of a DER such as, e.g., an AC unit, in an indoor structure in order to maintain the indoor temperature to be within the user-defined maximum and minimum temperature thresholds during the DR event. For example, such determination may be based on a calibrated RC-model.

Examples of the present disclosure include a system such as, e.g., a smart meter, that is capable of scheduling the start times and end times of multiple DERs in an indoor structure such as, e.g., a household, in order to provide a desired load flexibility for utility grid services. Examples include a system configured to control the AC system while keeping the indoor temperature of the home within a desired temperature range. In addition, the scheduling of the AC may be performed in coordination with other DERs to maximize grid flexibility by minimizing the net home load consumption while considering comfort bound constraints for all DERs. For example, the controller may turn on and off the AC at various times to avoid exceeding the net home power threshold during a Demand-Response (DR) event while maintaining the indoor temperature limits set by the customer.

Traditional demand response (DR) programs typically attempt to centrally control AC units from multiple households by aggregating control centrally, and consequently have difficulty considering individualized feedback from each household based on that household's specific usage patterns. Accordingly, there is a technical problem in that the indoor temperature of an indoor structure may not always be able to be maintained within a desired temperature comfort range for each household. A technical solution to this problem includes controlling, at the household level, the consumption of each DER or appliance located therein, so that the combined power consumption of all the DERs within the DR event does not exceed a power consumption limit. For example, the power consumption limit may be provided by the utility company.

FIG. 1 is an overview of a control system for controlling a plurality of DERs in an indoor structure, in accordance with various principles of the present disclosure. In FIG. 1, the power control system 100 includes a typical home or structure 110 that has a plurality of appliances, referred to herein as DERs, 120A, 120B, 120C and 120D, that may be typically present in a household. In various examples, operation of the DERs 120A-120D may take place during a grid service event window 130, also referred to as a DR event or time window, and in order to achieve desired power savings during the time window 130, each DER 120A-120D may be turned on and off at different times and for different durations. For example, the desired power savings may be achieved when the totality of power consumption equal to or lower than a requested power 140 that may be provided, e.g., by the power utility company. Accordingly, the requested power 140 is a power consumption limit.

In the example illustration of FIG. 1, DER 120A corresponds to a compressor for an AC unit, and its power consumption profile 150A shows a given power consumption that is constant and that extends over a first period of time 160A. Also, DER 120B corresponds to a water heater, and its power consumption profile 150B also shows a given power consumption that is constant and that extends over a second period of time 160B. As an example, the power consumption profile 150B shows that power consumption starts after the power consumption of DER 120A has ended, as illustrated in the x-axis that describes time. For example, periods of time 160A and 160B do not overlap and are successive to one another. In the example, DER 120C corresponds to the battery of an electric vehicle (EV), and the power consumption profile 150C of the EV battery extends over a period of time 160C and remains constant over that period of time 160C. In this example, the power consumption profile 150C shows that power consumption of the EV battery starts after the power consumption of the AC compressors ends and before the power consumption of the water heater starts. For example, the period of time 160C does not overlap the periods of time 160A and 160B. In the example, DER 120D corresponds to a solar panel, and thus has a negative power consumption because instead of consuming power, DER 120D generates power. In this example, the power consumption profile 150D extends over a period of time 160D, and the period of time 160D overlaps the period of time 160B during which the DER 120B is turned on. Accordingly, in this example, DERs 120B and 120D are turned on at substantially the same time. In various examples, although the power consumption profiles 150A-150D are shown to have little overlap, the various power consumption profiles 150A-150D for DERs 120A-120D, or for any other DERs not illustrated in FIG. 1, may overlap each other in terms of their start times and end times. In various examples, the system 100 operates as desired when the combination of all the power consumption profiles 150A-150D in operation during the grid service event window 140 remain under the requested power 140. For example, the combination of all the power consumption profiles 150A-150D may be determined as the sum of the power consumptions of each of the DERs at each time during the time window 130.

In various examples, the AC control system 100 is configured to schedule multiple DERs (air conditioner, electric water heater, electric vehicle, and the like) inside a household, office or other indoor structure, to minimize the net home power consumption, while at the same time keep the total power consumption for all DERs under a required power consumption limit. For example, minimizing the net home power consumption may mean maintaining the total power consumption of all the DERs within the indoor structure under the requested power 140. In the example of the AC compressor 120A, the power control system 100 may delay, or accelerate, the turning on of the AC in order to control the net power consumption of the DERs in the indoor structure. For example, if the AC compressor 120A and the EV battery 120C charging took place simultaneously, the net power threshold may be violated, i.e., the total power consumption may become greater than the request power 140. In this case, the AC compressor 120A may be turned off for a desired length of time in order to accommodate charging of the EV battery 120C and without violating the maximum power bound set for net household power consumption which is the requested power 140. For example, the start of operation of the AC compressor 120A may be delayed to after the operation of the EV battery 120C, or moved up to be before the operation of the EV battery 120C.

FIG. 2 illustrates a typical air conditioning operation. An air conditioning (AC) system 200 operates to maintain the indoor temperature 210 of a home, office or other indoor structure, between a desired temperature range, e.g., as set by a user. The temperature range is illustrated in FIG. 2 as being between an upper limit $T_{hi}$ and a lower limit $T_{lo}$. In this example, the temperature limits $T_{hi}$ and $T_{lo}$ are static and may not be breached by the indoor temperature 210. When the indoor temperature 210 reaches or approaches the upper limit $T_{hi}$, the system 200 may automatically switch on the air conditioner to decrease the indoor temperature 210 so as not to exceed the upper limit $T_{hi}$. On the other hand, when the indoor temperature 210 reaches or approaches the lower limit $T_{lo}$, the system 200 may switch off the air conditioner so that the temperature 210 does not drop below the lower limit $T_{lo}$. In FIG. 2, the outside temperature is illustrated at $T_{out}$ 220, and in this example is rising linearly over time periods $t_0$, $t_1$ and $t_2$.

In FIG. 2, the power consumption profile is illustrated by profile 230, and shows that power consumption increases when the AC is turned on when the temperature 210 reaches the upper limit $T_{hi}$. As a result of the AC being turned on, and the power consumption being at $P_{AC}$, the indoor temperature 210 drops over a period of time to the lower limit $T_{lo}$. When the temperature 210 is at the lower limit $T_{lo}$, at time $t_0$, the AC is turned off and, due to the outside temperature $T_{out}$ 220 steadily increasing and higher than the indoor temperature 210, the indoor temperature 210 starts increasing when the AC is turned off and, at time $t_1$, the indoor temperature 210 reaches the upper limit $T_{hi}$ once again. During the period of time between $t_0$ and $t_1$, power consumption of the AC system is close to, or equal to, zero because the AC is turned off. At time $t_1$, because the indoor temperature 210 has reached the upper limit $T_{hi}$, the AC is turned on again, the power consumption increases to $P_{AC}$, the indoor temperature 210 starts decreasing until reaching the lower limit $T_{lo}$ at time $t_2$. The above describes a typical indoor temperature control cycle.

In various examples, in order to maintain an indoor temperature that is below maximum comfort threshold in the time window $t_0$ to $t_2$, or below the upper temperature limit represented by the upper limit $T_{hi}$ illustrated in FIG. 2, the AC is turned on for a given period of time that is shorter than the time window $t_0$ to $t_2$. In an example, the AC on-duration time may change depending on the time at which the AC is being turned on within the given time window $t_0$ to $t_2$ due to the fact that the outdoor temperature 220 continues to rise over time and indoor temperature 210 may have different values based on the start time of the AC. The on-duration time variation may be determined by the way in which the indoor room temperature 210 dynamically changes over time, e.g., based on the outdoor temperature 220 and the physical characteristics of the indoor structure.

Principles of this disclosure provide a model-based approach to determine the dynamic behavior of indoor room temperature 210 over time. Based on this determination, an estimated AC on-duration may be determined as a function of the on-time delay and a forecast of the outdoor temperature 220. In addition, based on the determination of the dynamic behavior of indoor room temperature 210 over time, an estimated start time and end time of every DER in the indoor structure may be determined, while keeping the total power consumption below the requested amount during the time window $t_0$ to $t_2$.

Figure 3:
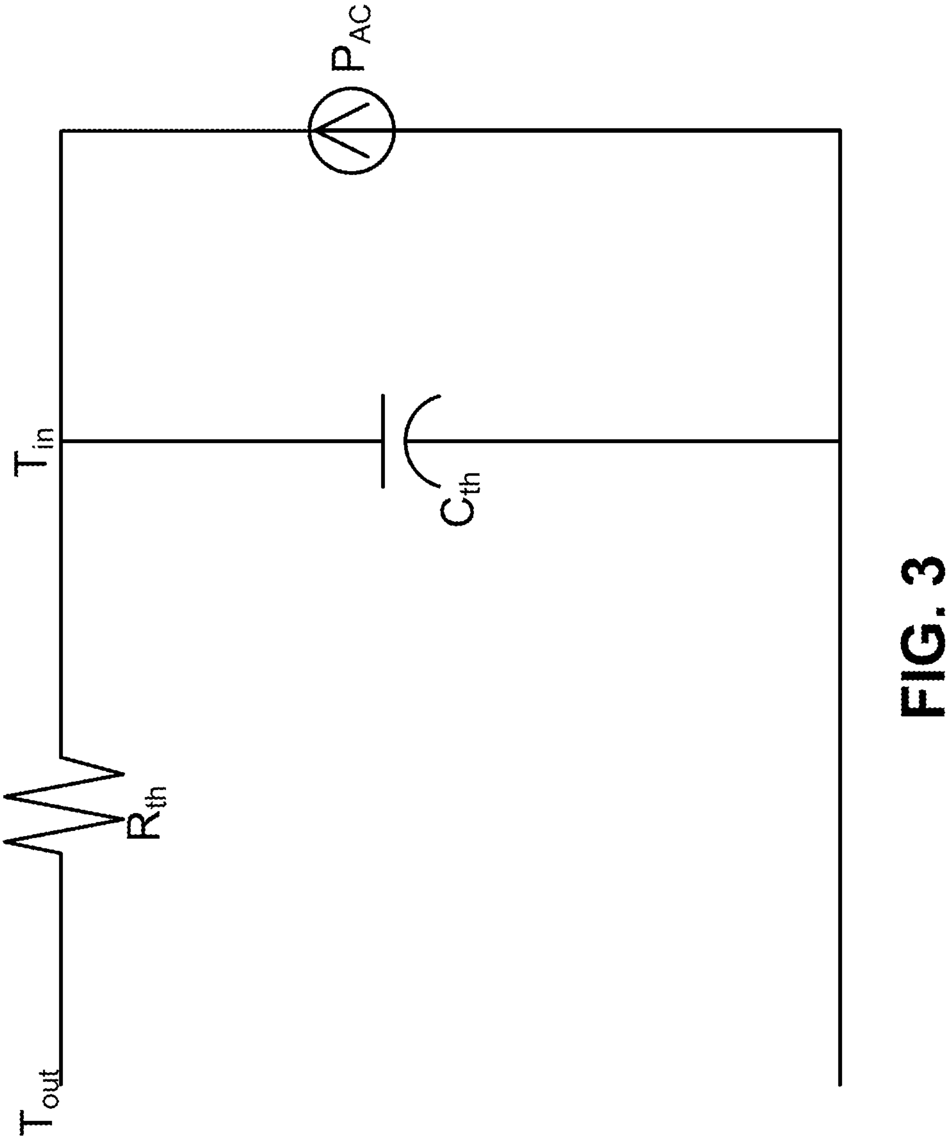
FIG. 3 is a diagram representing air conditioning parameters for a structure, in accordance with various principles of the present disclosure.

FIG. 3 is a diagram representing an indoor structure, in accordance with various principles of the present disclosure. For example, the dynamic indoor temperature $T_{in}$ may be modeled as a function of the AC power $P_{AC}$, the outdoor temperature $T_{out}$, and the home thermal parameters expressed by the thermal resistance $R_{th}$ and the thermal capacitance $C_{th}$. This is shown by the RC-circuit diagram in FIG. 3 below and the dynamical equation is in Equation (1) below.

$$\dot{T}_{in} = \left[\frac{T_{out} - T_{in}}{R_{th}C_{th}}\right] - \left[\frac{P_{AC}}{C_{th}}\right] \tag{1}$$

In FIG. 3, $T_{in}$ is the indoor temperature, $T_{out}$ is the outdoor temperature, $R_{th}$ is thermal resistance, $C_{th}$ is thermal capacitance. In various examples, the thermal parameters $R_{th}$ and $C_{th}$ of the indoor structure may depend on the materials, insulation, and other physical characteristics of the indoor structure. Among these parameters, the thermal resistance $R_{th}$ may represent the thermal loss in the indoor structure, and the thermal capacitance $C_{th}$ may represent the thermal energy hosting capacity of the indoor structure. In an example, the thermal resistance $R_{th}$ and the thermal capacitance Cat may be calibrated using, e.g., historical measurements of indoor temperature, outdoor temperature and DER consumption power in the indoor structure.

Figure 4:
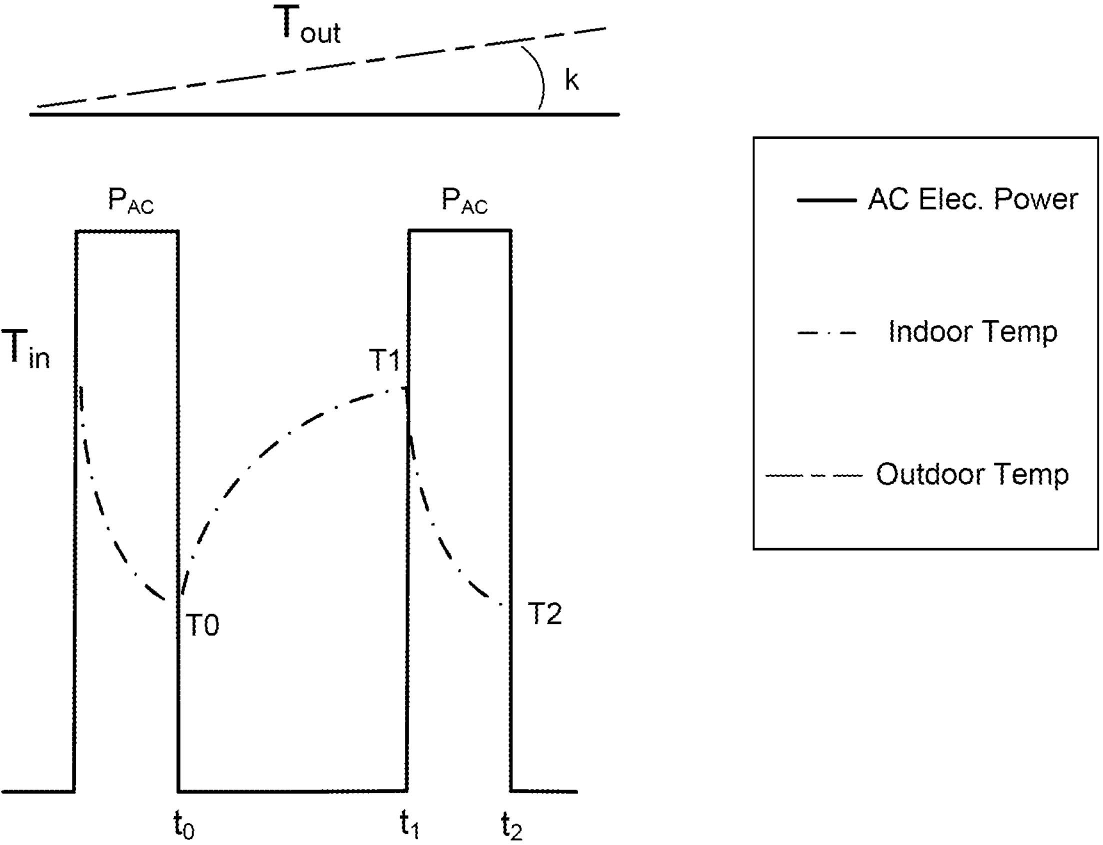
FIG. 4 illustrates an air conditioning temperature profile, in accordance with various principles of the present disclosure.

FIG. 4 illustrates an air conditioning temperature profile, in accordance with various principles of the present disclosure. In FIG. 4, the indoor temperature $T_{in}$ may be below a maximum temperature threshold, at which point the DER such as, e.g., the AC unit, may switch off. For example, due to a high outdoor temperature $T_{out}$, the indoor temperature may increase from a temperature $T_0$ to $T_1$ between times $t_0$ and $t_1$. For example, when the indoor temperature $T_{in}$ reaches the maximum temperature threshold and the AC switches on, the temperature may decrease to $T_0$. When the temperature reaches $T_0$, then the AC may be turned off again, and the indoor temperature may rise up to $T_1$ between times $t_0$ and $t_1$. When the indoor temperature reaches $T_1$, the AC may be turned on again, and the indoor temperature may decrease back to $T_2$ between times $t_1$ and $t_2$. In an example, although the temperature profile described in FIG. 4 appears to be similar to the temperature profile described in FIG. 2, a difference is that the upper temperature limit T1 in this example is a dynamic temperature limit and may vary over time based on, e.g., the power consumptions of other DERs within the same indoor structure.

Referring to FIGS. 3 and 4, Equation (2) below, derived from Equation (1) above when consumption $P_{AC}$ equals zero, may be used to calculate the product of $R_{th}$ and $C_{th}$.

$$R_{th}C_{th} = \frac{\int_{t_0}^{t_1}(T_{out} - T_{in})dt}{T_1 - T_0} \tag{2}$$

Using $R_{th}C_{th}$ thus calculated, $C_{th}$ may be derived using Equation (3) below:

$$C_{th} = \frac{\int_{t_1}^{t_2} P_{AC}dt}{(T_1 - T_2) + \frac{1}{R_{th}C_{th}}\int_{t_1}^{t_2}(T_{out} - T_{in})dt} \tag{3}$$

In various examples, the estimated thermal-resistance $R_{th}$ and thermal-capacitance $C_{th}$ govern the home indoor temperature variations across time based on the outdoor temperature and AC power $P_{AC}$, as described in Equation (1). For example, using Laplace's mathematical transformations, the indoor temperature dynamics in the time domain may be derived as shown in Equation (4) below:

$$T_{in}(t) = T_{out}(t_0) - kR_{th}C_{th} - R_{th}P_{AC} + kt + (kR_{th}C_{th} + R_{th}P_{AC} + T_{in}(t_0) - T_{out}(t_0)) \cdot e^{-\left(\frac{t}{R_{th}C_{th}}\right)} \tag{4}$$

Accordingly, knowing $R_{th}$, $C_{th}$, $T_{out}$, $P_{AC}$, and experimental factor k representing a slope of the outdoor temperature variation over time as illustrated in FIG. 4, it becomes possible to dynamically determine the indoor temperature $T_{in}$ at any point in time t. Based on the determined dynamic indoor temperature $T_{in}$, it becomes possible to calculate the minimum on-duration time $t_{min}$ of the AC, as further discussed below.

Figures 5A, 5B, 5C:
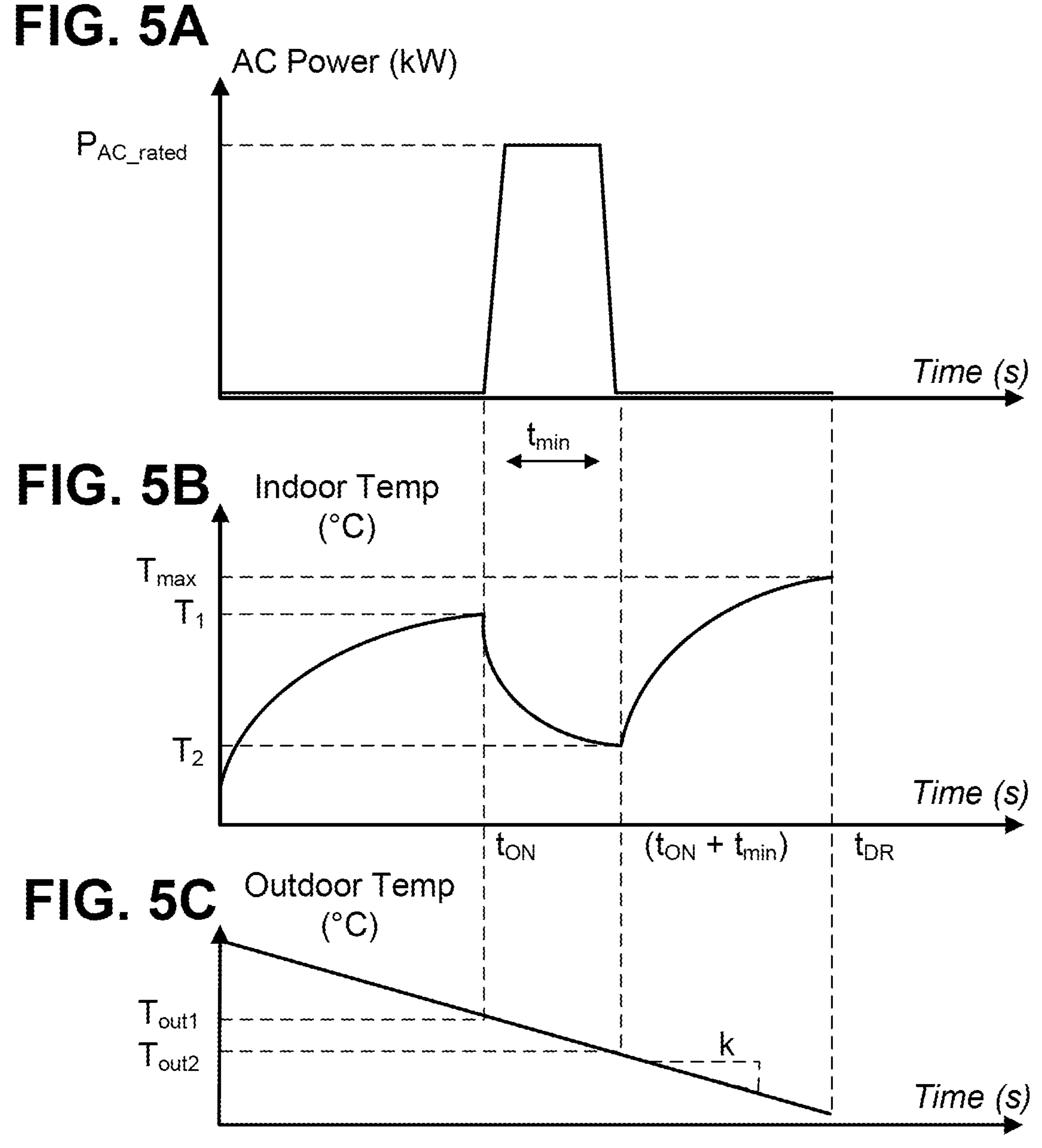
FIGS. 5A-5C illustrate AC power consumption and temperature profiles, in accordance with various principles of the present disclosure.

FIGS. 5A-5C illustrate AC power consumption and temperature profiles, in accordance with various principles of the present disclosure. FIG. 5A illustrates the power consumption profile $P_{AC}$ over time, where power increases rapidly to $P_{AC}$ during operation of the AC starting at time $t_{ON}$ and during duration $t_{min}$, and then decreases rapidly to zero at time $t_{ON}+t_{min}$ when the AC is turned off. In this case, $t_{min}$ is the minimum amount of time necessary to activate the AC in order to reach a desired temperature while keeping the power consumption at or below a required power consumption limit. FIG. 5B is a plot of the indoor temperature over time, which varies between a high temperature of $T_1$ and a low temperature of $T_2$. When correlated to FIG. 5A, the temperature decreases when the AC is turned on at $t_{ON}$ and increases again when the AC is turned off at $t_{ON}+t_{min}$. FIG. 5C is a plot of the outdoor temperature over time. In this case, the outdoor temperature is linearly dependent of time. For example, the outdoor temperature is uncorrelated to whether the AC of the indoor structure is turned on or off.

Accordingly, FIGS. 5B and 5C illustrate two time and temperature coordinates that formulate a problem with two equations and two unknowns. The first coordinate is the time $t_{ON}$ and indoor temperature $T_1$ when the AC is turned on. The second coordinate is the time $t_{ON}+t_{min}$ and indoor-temperature $T_2$ when the AC is turned off. The indoor temperature reaches the known maximum indoor temperature threshold $T_{max}$ at the end of a desired time duration $t_{DR}$ after the AC is turned off. Outdoor temperature measurements $T_{out1}$ and $T_{out2}$ at times $t_{ON}$ and $t_{ON}+t_{min}$ are used to estimate a linear outdoor temperature variation having a slope k.

In various examples, Equation (5) below may be used to solve the AC minimum on-duration $t_{min}$ that avoids having the indoor temperature exceed the maximum indoor temperature threshold $T_{max}$ at the end of a desired time duration $t_{DR}$ when the AC is delayed by $t_{ON}$.

$$T_{max} = T_{out2} - kR_{th}C_{th} + k[t_{DR} - (t_{ON} + t_{min})] + \left(kR_{th}C_{th} + \left\{T_{out1} - kR_{th}C_{th} - R_{th}P_{AC} + kt_{min} + (kR_{th}C_{th} + R_{th}P_{AC} + T_1 - T_{out1}) \cdot e^{-\left(\frac{t_{min}}{R_{th}C_{th}}\right)}\right\} - T_{out2}\right) \cdot e^{-\left(\frac{t_{DR} - (t_{ON} + t_{min})}{R_{th}C_{th}}\right)} \quad (5)$$

In various examples, FIG. 5C illustrates a case where the outdoor temperature varies linearly. In other cases, the outdoor temperature may be constant over time. In such cases, the calculated $t_{min}$ and $t_{ON}$ may be different than when the outdoor temperature varies linearly over time. Based on Equation (5) above, $t_{min}$ can be calculated as indicated in Equation (6) below:

$$t_{min} = R_{th}C_{th} \cdot \ln\left(\frac{T_1 + R_{th}P_{AC_{rated}} + (T_{out2} - T_{max}) \cdot e^{\left(\frac{t_{DR} - t_{ON}}{R_{th}C_{th}}\right)} - T_{out1}}{R_{th}P_{AC\_rated} + T_{out2} - T_{out1}}\right) \quad (6)$$

In examples, the above calculations allow the determination of the minimum amount of time $t_{min}$, and the time to turn on the DER $t_{ON}$, for any DER in order to achieve at least two objectives: i) keep the indoor temperature within an acceptable range of a desired temperature, and ii) remain below the required maximum allowed power consumption. In various examples, the same calculation may be performed for each one of the DERs located in an indoor structure, and referring back to FIG. 1, the above calculations may be performed not only for the DER 120A (AC unit), but for each of the other DERs such as, e.g., 120B, 120C and 120D, and any other DER present in the indoor structure 110.

Figure 6A:
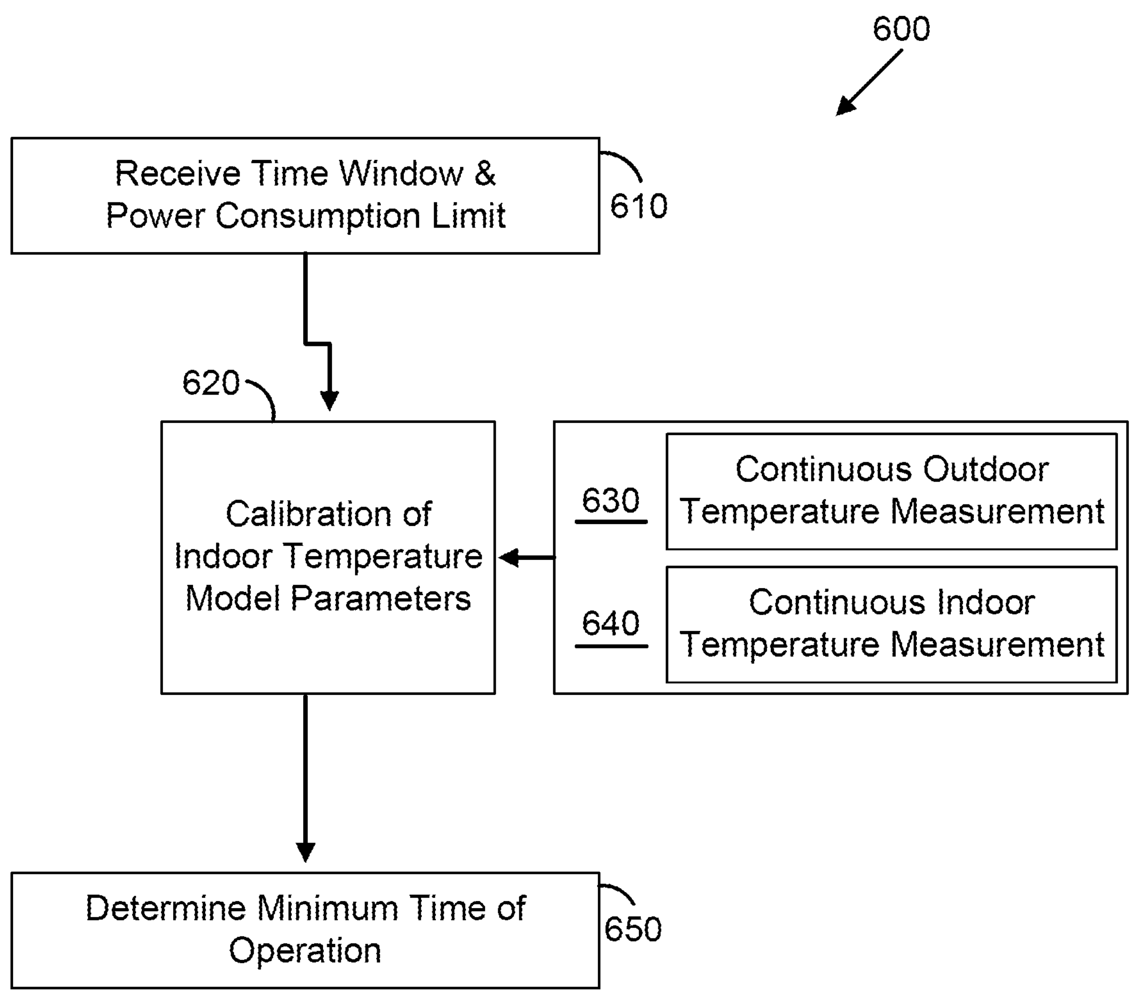
FIG. 6A is a flow chart illustrating a method of managing a distributed energy resource (DER) within an indoor structure, in accordance with various principles of the present disclosure.

FIG. 6A is a flow chart illustrating a method of managing a distributed energy resource (DER) within an indoor structure or a group of indoor structures within a same utility network, in accordance with various principles of the present disclosure. For the sole purpose of convenience, method 600 is described through use of at least the example system 700 described in combination with the systems discussed above. However, it is appreciated that the method 600 may be performed by any suitable system. In FIG. 6A, the method 600 includes operation 610, where a time window and a power consumption limit for the DER, e.g., an AC unit, are received. In various examples, the time window may correspond to a demand-response (DR) event which may be, e.g., a peak consumption event in the life of the indoor structure, or in the life of other indoor structures or households connected to the same utility network. For example, in the case of a home, or of all homes within a utility network, the DR event may be early in the morning or late in the afternoon when activity in the home is at its highest, e.g., when members of the household ready themselves to go to work or school, or when they come back home from work or school. As another example, the power consumption limit may be received by a utility provider, and may be applicable during the received time window. As another example, the power consumption limit may be a limit beyond which higher rates may be applicable to each additional unit of power such as, e.g., each additional kWh. Accordingly, it may be advantageous to maintain the power consumption below the power consumption limit. In various examples, based on the received time window and power consumption limit, the next operation in method 600 may be operation 620 further discussed below.

During operation 630, the outdoor temperature, e.g., the temperature outside the indoor structure(s), is measured. For example, the outdoor temperature is measured at a given point in time within the time window. In an example, the outside temperature may be constant during the time window. In another example, the outside temperature may vary over time during the time window. During operation 640, the indoor temperature may be determined. For example, the indoor temperature may be determined as described in Equation (4) above based on the measured outdoor temperature, the estimated thermal-resistance of the indoor structure, the estimated thermal-capacitance of the indoor structure, the start time of operation of the DER, the received power consumption limit, and the slope of the variation of the outdoor temperature over time. During operation 620, the indoor temperature model parameters such as, e.g., $R_{th}$ and $C_{th}$, ma be calibrated.

During operation 650, the minimum time of operation of the DER is determined. For example, the minimum time of operation of the DER is determined so that the power consumption of the DER is equal to or below the received power consumption limit. In an example, the minimum time of operation of the DER may be determined as described in Equation (6) above based on the outdoor temperature at a beginning of operation of the DER, the outdoor temperature at an end of operation of the DER, the end time of the received time window, the time of operation of the DER, the received power consumption limit, the slope of variation of the outdoor temperature over time, the start time of operation of the DER, the estimated thermal-resistance of the indoor structure, the estimated thermal-capacitance of the indoor structure, the measured outdoor temperature, and the indoor temperature at the time of operation of the DER. For example, based on the determined minimum time of operation of the DER, the start time and the end time of operation of the DER may be determined.

Figure 6B:
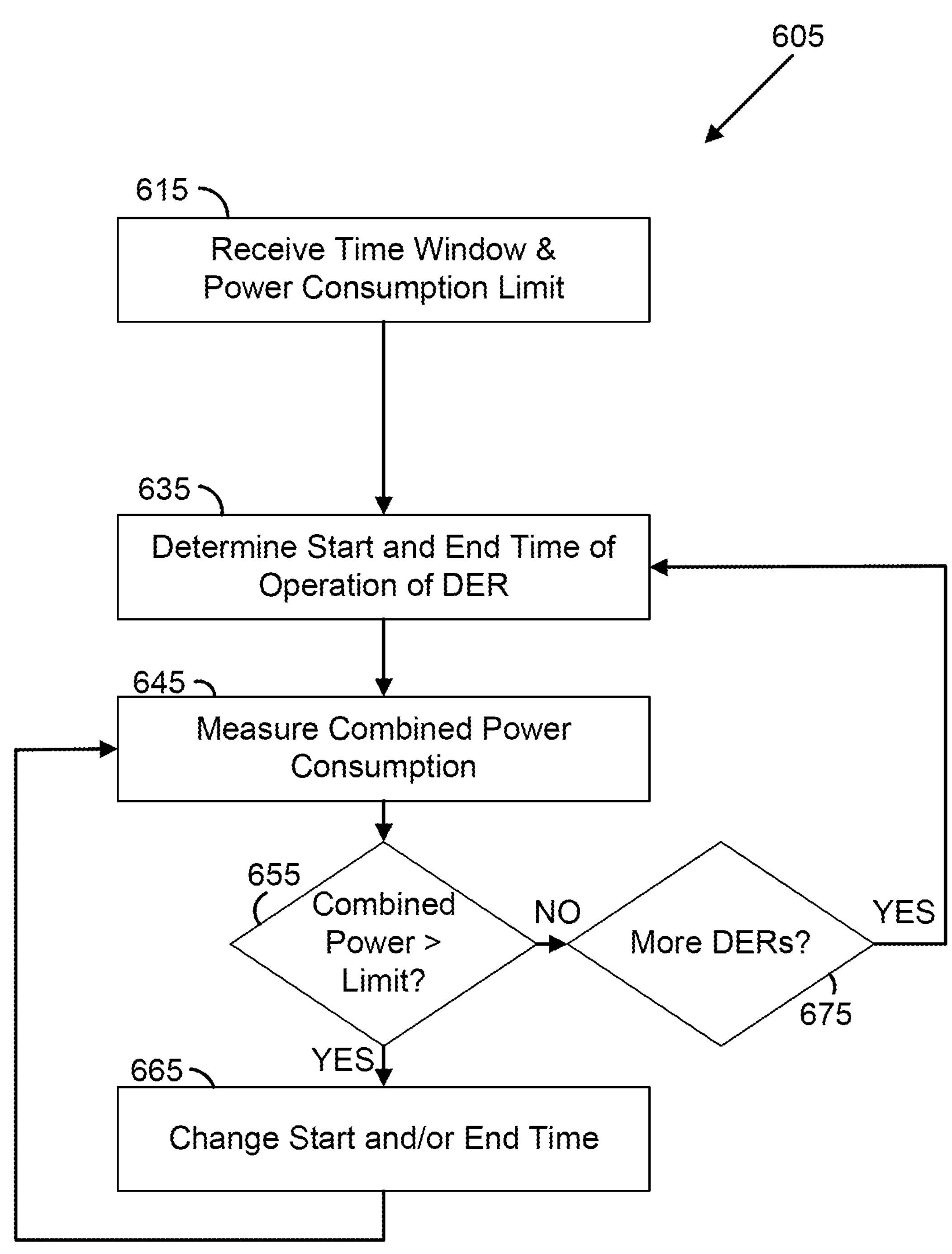
FIG. 6B is a flow chart illustrating a method of managing a plurality of distributed energy resources (DERs) within an indoor structure, in accordance with various principles of the present disclosure.

FIG. 6B is a flow chart illustrating a method of managing a plurality of distributed energy resources (DERs) within an indoor structure, in accordance with various principles of the present disclosure. For the sole purpose of convenience, method 605 is described through use of at least the example system 700 described in combination with the systems discussed above. However, it is appreciated that the method 605 may be performed by any suitable system. In FIG. 6B, the method 605 includes operation 615, where a time window and a power consumption limit for the totality of the DERs located in an indoor structure(s), e.g., the combination of an AC unit, a car charger, a water heater, and the like, are received. In various examples, the time window may correspond to a demand-response (DR) or grid event, as discussed above. For example, the power consumption limit is received by a utility provider, may be applicable during the received time window, and concerns the total consumption of all the DERs, e.g., appliances, located in the indoor structure or household.

During operation 635, the start time and end time of operation of a first DER of the plurality of DERs during the received time window is determined. For example, the start and end times may be determined as discussed above with respect to operation 650. During operation 645, the combined power consumption of all the DERs located in the indoor structure and that are turned on during the received time window is calculated. For example, the combined power consumption of all the DERs may be determined by summing up the power consumption of each DER that is turned on during the received time window. During operation 655, the determined combined power consumption is compared to the received power consumption limit. If, during operation 655, the combined power consumption is greater than the received power consumption limit, then during operation 665, the start time, the end time, or both the start time and the end time of operation of the first DER is changed. For example, the start time of operation of the first DER may be delayed, or the end time of operation of the first DER may be moved up, or both the start time and the end time of operation of the first DER may be varied. When the start time, the end time, or both the start time and the end time of operation of the first DER is changed, the method 605 returns to operation 645 during which the combined power consumption is measured anew, and the method 605 continues to operations 655, 665 and/or 675.

In various examples if, during operation 655, the combined power consumption is equal to or smaller than the received power consumption limit, then during operation 675, a determination is made whether a second DER is in operation, e.g., is turned on. If it is determined during operation 675 that a second DER is in operation, then during operation 635, the start and end times of operation of the second DER are determined, and the method 605 continues to operations 645, 655, 665 and/or 675. According to various principles of the present disclosure, the method 605 determines, and varies when needed, the start times and end times of each of the DERs located in the indoor structure(s) in order to ensure that the combined power consumption of all the DERs remains equal to or lower than the power consumption limit that was received during operation 625.

Figure 7:
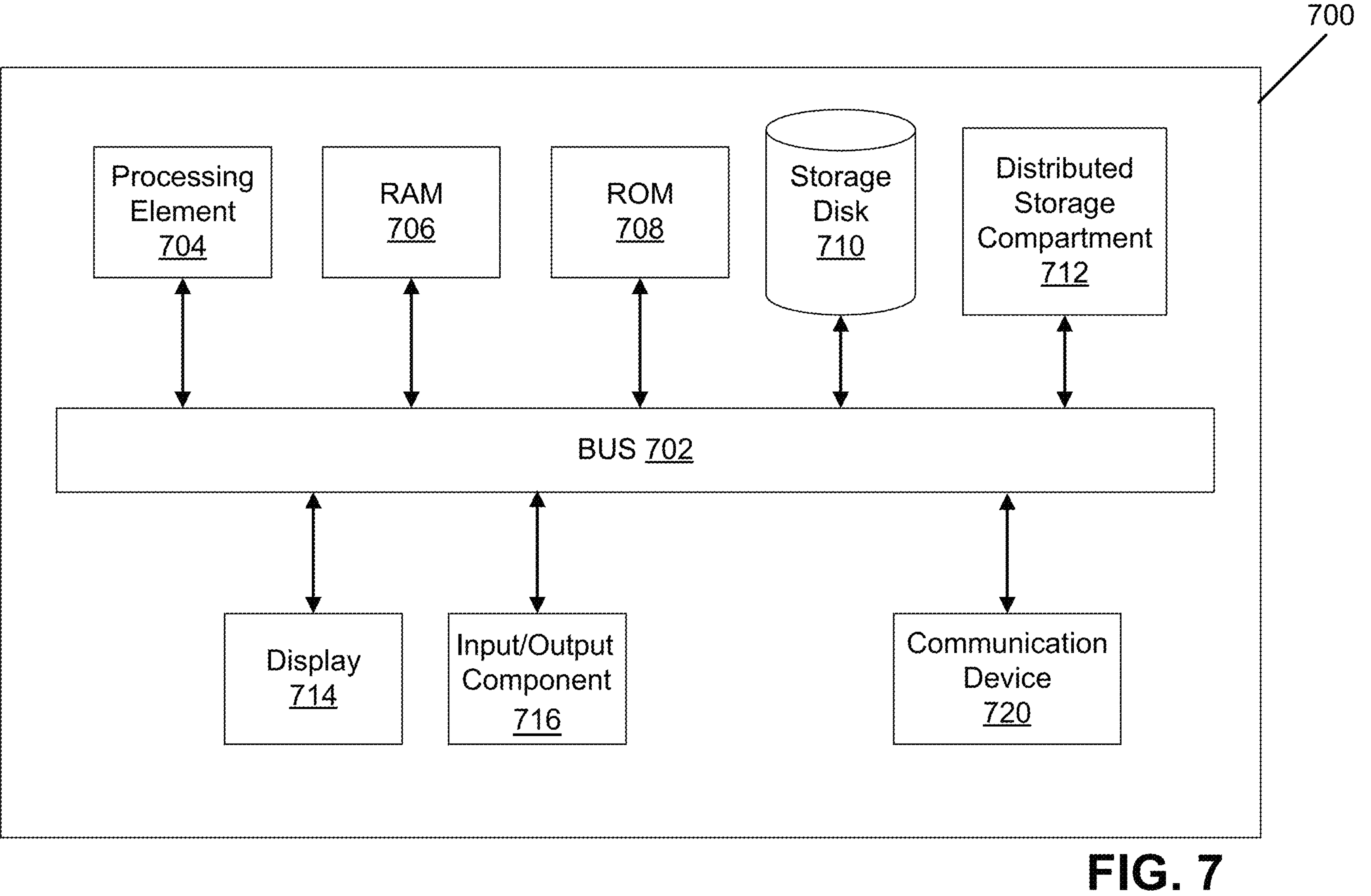
FIG. 7 depicts a block diagram of a computing device.

FIG. 7 depicts a block diagram of a computing device, according to various principles of the present disclosure. In the illustrated example, the computing device 700 may include a bus 702 or other communication mechanism of similar function for communicating information, and at least one processing element 704 (collectively referred to as processing element 704) coupled with bus 702 for processing information. As will be appreciated by those skilled in the art, the processing element 704 may include a plurality of processing elements or cores, which may be packaged as a single processor or in a distributed arrangement. Furthermore, a plurality of virtual processing elements 704 may be included in the computing device 700 to provide the control or management operations for the system 100 and methods 600 and 605 illustrated above.

The computing device 700 may also include one or more volatile memory(ies) 706, which can for example include random access memory(ies) (RAM) or other dynamic memory component(s), coupled to one or more busses 702 for use by the at least one processing element 704. Computing device 700 may further include static, non-volatile memory(ies) 708, such as read only memory (ROM) or other static memory components, coupled to busses 702 for storing information and instructions for use by the at least one processing element 704. A storage component 710, such as a storage disk or storage memory, may be provided for storing information and instructions for use by the at least one processing element 704. As will be appreciated, the computing device 700 may include a distributed storage component 712, such as a networked disk or other storage resource available to the computing device 700.

The computing device 700 may be coupled to one or more displays 714 for displaying information to a user. The computing device 700 may further include an input/output (I/O) component 716, such as a serial connection, digital connection, network connection, or other input/output component for allowing intercommunication with other computing components and the various components of the system 100 and methods 600 and 605 illustrated above.

In various embodiments, computing device 700 can be connected to one or more other computer systems via a network to form a networked system. Such networks can for example include one or more private networks or public networks, such as the Internet. In the networked system, one or more computer systems can store and serve the data to other computer systems. The one or more computer systems that store and serve the data can be referred to as servers or the cloud in a cloud computing scenario. The one or more computer systems can include one or more web servers, for example. The other computer systems that send and receive data to and from the servers or the cloud can be referred to as client or cloud devices, for example. Various operations of the system 100 and methods 600 and 605 illustrated above may be supported by operation of the distributed computing systems.

The computing device 700 may be operative to control operation of the components of the system 100 and methods 600 and 605 illustrated above through a communication device such as, e.g., communication device 720, and to handle data provided from the data sources as discussed above with respect to the system 100 and methods 600 and 605. In some examples, analysis results are provided by the computing device 700 in response to the at least one processing element 704 executing instructions contained in memory 706 or 708 and performing operations on the received data items. Execution of instructions contained in memory 706 and/or 708 by the at least one processing element 704 can render the system 100 and methods 600 and 605 operative to perform methods described herein.

The term "computer-readable medium" as used herein refers to any media that participates in providing instructions to the processing element 704 for execution. Such a medium may take many forms, including but not limited to, non-volatile media, volatile media, and transmission media. Non-volatile media includes, for example, optical or magnetic disks, such as disk storage 710. Volatile media includes dynamic memory, such as memory 706. Transmission media includes coaxial cables, copper wire, and fiber optics, including the wires that include bus 702.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to the processing element 704 for execution. For example, the instructions may initially be carried on the magnetic disk of a remote computer. The remote computer can load the instructions into its dynamic memory and send the instructions over a telephone line using a modem. A modem local to computing device 700 can receive the data on the telephone line and use an infra-red transmitter to convert the data to an infra-red signal. An infra-red detector coupled to bus 702 can receive the data carried in the infra-red signal and place the data on bus 702. Bus 702 carries the data to memory 706, from which the processing element 704 retrieves and executes the instructions. The instructions received by memory 706 and/or memory 708 may optionally be stored on storage device 710 either before or after execution by the processing element 704.

In accordance with various embodiments, instructions operative to be executed by a processing element to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Examples of the disclosure may be described according to the following aspects.

Aspect 1. A method of managing a distributed energy resource (DER) within an indoor structure, the method comprising receiving a time window; receiving a power consumption limit; measuring an outdoor temperature; determining an indoor temperature of the indoor structure based at least on the measured outdoor temperature, the received power consumption limit, and the received time window; determining a minimum time of operation of the DER so that a power consumption of the DER is equal to or below the received power consumption limit without compromising a quality of service controlled by the DER.

Aspect 2. The method of aspect 1, wherein the power consumption limit is applicable during the received time window.

Aspect 3. The method of aspect 1, wherein determining the indoor temperature comprises determining the indoor temperature via Equation (4):

$$T_{in}(t) = T_{out}(t_0) - kR_{th}C_{th} - R_{th}P_{AC} + kt + (kR_{th}C_{th} + R_{th}P_{AC} + T_{in}(t_0) - T_{out}(t_0)) \cdot e^{-\left(\frac{t}{R_{th}C_{th}}\right)} \tag{4}$$

wherein $T_{out}$ is the measured outdoor temperature; $R_{th}$ is an estimated thermal-resistance of the indoor structure; $C_{th}$ is an estimated thermal-capacitance of the indoor structure; $t_0$ is a start time of operation of the DER; $P_{AC}$ is the received power consumption limit; and k is a slope of variation of the outdoor temperature over time.

Aspect 4. The method of aspect 3, wherein determining the minimum time of operation of AC $t_{min}$ that avoids having the indoor temperature exceed a maximum indoor temperature threshold $T_{max}$ at an end time of the received time window $t_{DR}$ when the AC is delayed by $t_{ON}$, and with a constant outdoor temperature based on Equation (6):

$$t_{min} = R_{th}C_{th} \cdot \ln\left(\frac{T_1 + R_{th}P_{AC} + (T_{out2} - T_{max}) \cdot e^{\left(\frac{t_{DR} - t_{ON}}{R_{th}C_{th}}\right)} - T_{out1}}{R_{th}P_{AC} + T_{out2} - T_{out1}}\right) \tag{6}$$

wherein $T_{out2}$ is the outdoor temperature at an end of operation of the DER; $t_{DR}$ is an end time of the received time window; $t_{ON}$ is a time of operation of the DER; $T_1$ is an indoor temperature at time $t_{ON}$; and $T_{out1}$ is the outdoor temperature at a beginning of operation of the DER.

Aspect 5. The method of aspect 4, wherein determining the minimum time of operation of AC $t_{min}$ that avoids having the indoor temperature exceed a maximum indoor temperature threshold $T_{max}$ at an end time of the received time window $t_{DR}$ when the AC is delayed by $t_{ON}$, and with a linear outdoor temperature variation over time with a slope of k, wherein determining the maximum indoor temperature comprises determining the maximum indoor temperature based on Equation (5):

$$T_{max} = T_{out2} - kR_{th}C_{th} + k[t_{DR} - (t_{ON} + t_{min})] + \left(kR_{th}C_{th} + \left\{T_{out1} - kR_{th}C_{th} - R_{th}P_{AC} + kt_{min} + (kR_{th}C_{th} + R_{th}P_{AC} + T_1 - T_{out1}) \cdot e^{-\left(\frac{t_{min}}{R_{th}C_{th}}\right)}\right\} - T_{out2}\right) \cdot e^{-\left(\frac{t_{DR} - (t_{ON} + t_{min})}{R_{th}C_{th}}\right)}. \tag{5}$$

Aspect 6. A method of managing a plurality of distributed energy resources (DERs) within an indoor structure, the method comprising receiving a time window; receiving a power consumption limit; determining a combined power consumption of the plurality of DERs in operation during the received time window; and for each DER and during the received time window, determining a start time of operation thereof and an end time of operation thereof so that the determined combined power consumption is equal to or lower than the received power consumption limit without compromising a quality of service controlled by individual DER.

Aspect 7. The method of aspect 6, wherein measuring the combined power consumption of the plurality of DERs in operation during the received time window comprises calculating a sum of the power consumptions of each DER that is in operation during the received time window.

Aspect 8. The method of aspect 6, wherein when the measured combined power consumption of the DERs in operation during the received time window is greater than the received power consumption limit, the method further comprises changing one of the start time and the end time of at least one of the DERs so that the measured combined power consumption of the DERs in operation during the received time window is equal to or lower than the received power consumption limit without compromising a quality of service controlled by the DER.

Aspect 9. The method of aspect 8, wherein changing one of the start time and the end time of a DER comprises changing one of the start time and the end time of the DER so as to reduce an overlap of the power consumption thereof with a power consumption of another DER during the time window without compromising a quality of service controlled by the DER.

Aspect 10. The method of aspect 9, wherein changing one of the start time and the end time of the DER so as to reduce the overlap of the power consumption thereof with a power consumption of another DER during the time window results in a lower combined power consumption without compromising a quality of service controlled by the DER.

Aspect 11. A system for managing a distributed energy resource (DER) within an indoor structure, the system comprising: a data receiver; an updatable data repository functionally coupled to the data receiver; a display device functionally coupled to the data receiver; a processor operatively coupled to the data receiver, to the updatable data repository and to the display device; and a memory coupled to the processor, the memory storing instructions that, when executed by the processor, perform a set of operations comprising: receiving, at the data receiver, a time window; receiving, at the data receiver, a power consumption limit; measuring an outdoor temperature; determining, via the processor, an indoor temperature of the indoor structure based at least on the measured outdoor temperature, the received power consumption limit, and the received time window; determining, via the processor, a minimum time of operation of the DER so that a power consumption of the DER is equal to or below the received power consumption limit without compromising a quality of service controlled by the DER.

Aspect 12. The system of aspect 11, wherein the DER comprises one of an AC unit, a water heater, an electric vehicle charger, and a solar panel.

Aspect 13. A system for managing a plurality of distributed energy resources (DERs) within an indoor structure, the system comprising: a data receiver; an updatable data repository functionally coupled to the data receiver; a display device functionally coupled to the data receiver; a processor operatively coupled to the data receiver, to the updatable data repository and to the display device; and a memory coupled to the processor, the memory storing instructions that, when executed by the processor, perform a set of operations comprising: receiving, at the data receiver, a time window; receiving, at the data receiver, a power consumption limit; determining, via the processor, a combined power consumption of the plurality of DERs in operation during the received time window; and for each DER and during the received time window, determining, via the processor, a start time of operation thereof and an end time of operation thereof so that the determined combined power consumption is equal to or lower than the received power consumption limit without compromising a quality of service controlled by the DER.

Aspect 14. The system of aspect 13, wherein the DERs comprise at least one of an AC unit, a water heater, an electric vehicle charger, and a solar panel.

Aspect 15. The system of aspect 13, wherein the combined power consumption of DERs in operation during the received time window is determined by calculating a sum of the power consumptions of each DER that is in operation during the received time window.

Aspect 16. The system of aspect 13, wherein when the measured combined power consumption of the plurality of DERs in operation during the received time window is greater than the received power consumption limit, the system changes one of the start time and the end time of at least one of the DERs so that the determined combined power consumption of the plurality of DERs in operation during the received time window is equal to or less than the received power consumption limit without compromising a quality of service controlled by the DER.

Various modifications and alterations of this disclosure will become apparent to those skilled in the art without departing from the scope and spirit of this disclosure, and it should be understood that the inventive scope of this disclosure is not to be unduly limited to the illustrative examples set forth herein.

Various modifications and alterations of this disclosure will become apparent to those skilled in the art without departing from the scope and spirit of this disclosure, and it should be understood that the inventive scope of this disclosure is not to be unduly limited to the illustrative examples set forth herein.

What is claimed is:

1. A method of managing a distributed energy resource (DER) within an indoor structure, the method comprising:

receiving, at a processor, a time window;

receiving, at the processor, a power consumption limit;

measuring an outdoor temperature;

determining, using the processor, an indoor temperature of the indoor structure based at least on the measured outdoor temperature, the received power consumption limit, and the received time window;

determining, using the processor, based on at least the power consumption limit and the indoor temperature over time, a minimum time of operation of the DER so as to keep the indoor temperature within an acceptable range during the time window, wherein the minimum time of operation is determined based on a power consumption of the DER being less than the power consumption limit during the minimum time of operation; and operating the DER based on the minimum time of operation.

2. The method of claim 1, wherein the power consumption limit is applicable during the received time window.

3. The method of claim 1, wherein determining the indoor temperature comprises determining the indoor temperature via Equation (4):

$$T_{in}(t) = T_{out}(t_0) - kR_{th}C_{th} - R_{th}P_{AC} + kt + (kR_{th}C_{th} + R_{th}P_{AC} + T_{in}(t_0) - T_{out}(t_0)) \cdot e^{-\left(\frac{t}{R_{th}C_{th}}\right)} \tag{4}$$

wherein:

$T_{out}$ is the measured outdoor temperature;

$R_{th}$ is an estimated thermal-resistance of the indoor structure;

$C_{th}$ is an estimated thermal-capacitance of the indoor structure;

$t_0$ is a start time of operation of the DER;

$P_{AC}$ is the received power consumption limit; and k is a slope of variation of the outdoor temperature over time.

4. The method of claim 3, wherein determining the minimum time of operation of AC $t_{min}$ that avoids having the indoor temperature exceed a maximum indoor temperature threshold $T_{max}$ at an end time of the received time window $t_{DR}$ when the AC is delayed by $t_{ON}$, and with a constant outdoor temperature based on Equation (6):

$$t_{min} = R_{th}C_{th} \cdot \ln\left(\frac{T_1 + R_{th}P_{AC} + (T_{out2} - T_{max}) \cdot e^{\left(\frac{t_{DR}-t_{ON}}{R_{th}C_{th}}\right)} - T_{out1}}{R_{th}P_{AC} + T_{out2} - T_{out1}}\right) \tag{6}$$

wherein:

$T_{out2}$ is the outdoor temperature at an end of operation of the DER;

$t_{DR}$ is an end time of the received time window;

$t_{ON}$ is a time of operation of the DER;

$T_1$ is an indoor temperature at time $t_{ON}$; and $T_{out1}$ is the outdoor temperature at a beginning of operation of the DER.

5. The method of claim 4, wherein determining the minimum time of operation of AC $t_{min}$ that avoids having the indoor temperature exceed a maximum indoor temperature threshold $T_{max}$ at an end time of the received time window $t_{DR}$ when the AC is delayed by $t_{ON}$, and with a linear outdoor temperature variation over time with a slope of k, wherein determining the maximum indoor temperature comprises determining the maximum indoor temperature based on Equation (5):

$$T_{max} = T_{out2} - kR_{th}C_{th} + k[t_{DR} - (t_{ON} + t_{min})] + \left(kR_{th}C_{th} + \left\{T_{out1} - kR_{th}C_{th} - R_{th}P_{AC} + kt_{min} + (kR_{th}C_{th} + R_{th}P_{AC} + T_1 - T_{out1}) \cdot e^{-\left(\frac{t_{min}}{R_{th}C_{th}}\right)}\right\} - T_{out2}\right) \cdot e^{-\left(\frac{t_{DR} - (t_{ON} + t_{min})}{R_{th}C_{th}}\right)}. \tag{5}$$

6. A system for managing a distributed energy resource (DER) within an indoor structure, the system comprising:

a data receiver;

an updatable data repository functionally coupled to the data receiver;

a display device functionally coupled to the data receiver;

a processor operatively coupled to the data receiver, to the updatable data repository and to the display device; and a memory coupled to the processor, the memory storing instructions that, when executed by the processor, perform a set of operations comprising:

receiving, at the data receiver, a time window;

receiving, at the data receiver, a power consumption limit;

measuring an outdoor temperature;

determining, via the processor, an indoor temperature of the indoor structure based at least on the measured outdoor temperature, the received power consumption limit, and the received time window;

determining, via the processor, based on at least the power consumption limit and the indoor temperature over time, a minimum time of operation of the DER so as to keep the indoor temperature within an acceptable range during the time window, wherein the minimum time of operation is determined based on a power consumption of the DER being less than the power consumption limit during the minimum time of operation; and direct operation of the DER based on the minimum time of operation.

7. The system of claim 6, wherein the DER comprises one of an AC unit, a water heater, an electric vehicle charger, and a solar panel.

* * * * *